US008213456B2

(12) United States Patent
Terashima

(10) Patent No.: US 8,213,456 B2
(45) Date of Patent: Jul. 3, 2012

(54) COMMUNICATIONS SYSTEM AND COMMUNICATION APPARATUS

(75) Inventor: Toru Terashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 852 days.

(21) Appl. No.: 12/100,568

(22) Filed: Apr. 10, 2008

(65) Prior Publication Data

US 2008/0259888 A1 Oct. 23, 2008

(30) Foreign Application Priority Data

Apr. 18, 2007 (JP) ................. 2007-108956

(51) Int. Cl.
H04L 12/66 (2006.01)
(52) U.S. Cl. ....................... 370/463; 709/249
(58) Field of Classification Search ............. 340/310.11; 709/249; 375/257; 370/463
See application file for complete search history.

(56) References Cited

U.S. PATENT DOCUMENTS

| 2006/0152344 | A1* | 7/2006 | Mowery, Jr. ............. 340/310.11 |
| 2006/0265480 | A1* | 11/2006 | Kim et al. ...................... 709/220 |
| 2007/0030823 | A1* | 2/2007 | Guo et al. ....................... 370/328 |
| 2007/0198748 | A1* | 8/2007 | Ametsitsi et al. ............. 709/249 |
| 2007/0271398 | A1* | 11/2007 | Manchester et al. .......... 709/249 |
| 2008/0205417 | A1* | 8/2008 | Li ................................. 370/401 |

FOREIGN PATENT DOCUMENTS

| JP | 2002-319947 | 10/2002 |
| JP | 2002-374189 | 12/2002 |
| JP | 2005-354159 | 12/2005 |
| JP | 2006-109022 | 4/2006 |
| JP | 2006-197304 | 7/2006 |

OTHER PUBLICATIONS

Japanese Patent Office, Office Action, issued in connection with Japanese Patent Application Serial No. 2007-108956, mailed Feb. 28, 2012. (6 pages).

* cited by examiner

Primary Examiner — Derrick Ferris
Assistant Examiner — Matthew Hopkins
(74) Attorney, Agent, or Firm — K&L Gates LLP

(57) ABSTRACT

Disclosed herein is a communications system that uses multiple transmission media, the system including: communications interface combining adapters connected via a power-line transmission path and a wireless transmission path between wireless LAN access points, each adapter having a power line communication interface and a wireless LAN interface, the wireless LAN interface having an access point function and an inter-access point communication function; wireless LAN terminals connected to the access points included in the adapters; and a wired LAN terminal connected to a wired LAN interface included in at least some of the adapters. Data transfer between the wireless LAN terminals or between one of the wireless LAN terminals and the wired LAN terminal is performed via a high-speed combined interface logically formed by using the power-line transmission path and inter-access point communication between the adapters to which the terminals participating in the data transfer are connected.

7 Claims, 6 Drawing Sheets

FIG. 8 -PRIOR ART
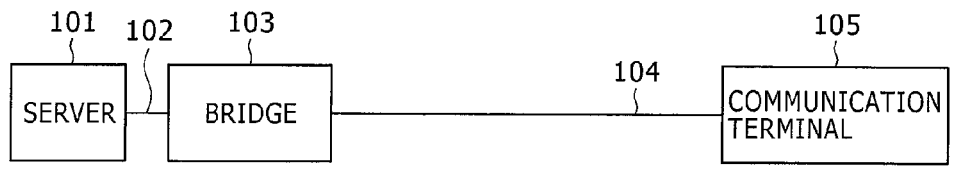
FIG. 9 -PRIOR ART
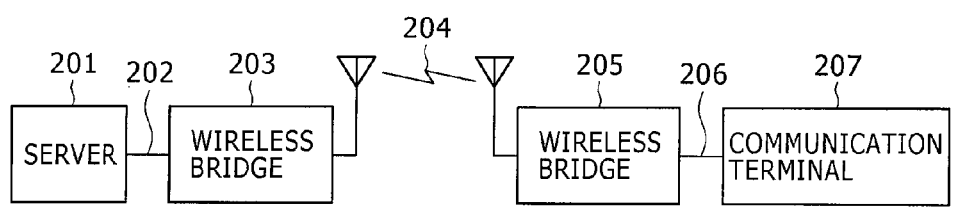
FIG. 10 -PRIOR ART
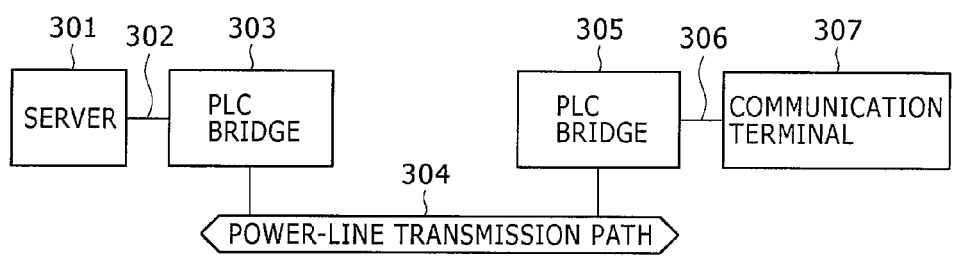

COMMUNICATIONS SYSTEM AND COMMUNICATION APPARATUS

CROSS REFERENCES TO RELATED APPLICATIONS

The present application claims priority to Japanese Patent Application JP 2007-108956, filed in the Japanese Patent Office on Apr. 18, 2007, the entire contents of which is being incorporated herein by reference.

BACKGROUND

The present application relates to a communications system and a communication apparatus that build a local area network (LAN) in a building. In particular, the present application relates to a communications system and a communication apparatus that build a LAN easily using a plurality of transmission media.

More specifically, the present application relates to a communications system and a communication apparatus that build a LAN easily in a building using a wireless LAN and power line communication. In particular, the present application relates to a communications system and a communication apparatus that realize high-speed communication by using the wireless LAN and the power line communication at the same time.

Use of an information providing service established on a wide area network, typified by the Internet, has become widespread in recent years, and downloading of large-size data files, distribution of video streams, and so on have become very common. One common mode of enjoying these types of services at home or at other similar places is as follows. A bridge device, such as a router, is connected to a backbone network, such as the Internet, via wired broadband communication, such as asynchronous digital subscriber line (ADSL) or a cable TV. Data is transferred from the bridge device to an information terminal, such as a personal computer (PC), over a LAN built in the home.

FIG. 8 shows an exemplary structure of a communications system for using the Internet at home. A bridge device 103, such as a router, is provided in the home, and the bridge device 103 is connected to a server 101, which is a source of information, via an external network 102, such as the Internet. In addition, a local area network (LAN), such as an Ethernet (registered trademark) network, is built in the home, and a communication terminal 105, such as a PC, is connected to the LAN. The Internet Protocol (IP) is implemented on the communication terminal 105, so that the communication terminal 105 is capable of acquiring data from the server 101 on the Internet to allow the data to be viewed via a browser screen or the like. The IP is described in RFC (Request For Comment)-791 issued by IETF (Internet Engineering Task Force).

In recent years, wireless LANs conforming to IEEE 802.11, for example, have become widespread, and it has become easy to build a LAN in a wireless manner. Accordingly, the bridge device is, as the router, connected to the backbone network, such as the Internet, and functions in the home as an access point for the wireless LAN to provide a service area to a wireless communication terminal. Because the wireless LAN allows flexible Internet connection, the wireless LAN is not simply a substitute for an existing wired LAN but is able to provide a means to connect to the Internet even at public places, such as a hotel, an airport lounge, a station, and a cafe.

FIG. 9 is a schematic diagram illustrating an exemplary structure of a communications system using the wireless LAN. In FIG. 9, a wireless bridge 203 has a network interface (router) function of connecting to a server 201 via a wired transmission path 202, and a function as a wireless LAN access point for a wireless terminal. The wireless bridge 203 acquires data from the server 201 and transfers the acquired data over a wireless transmission path 204. In addition, the wireless bridge 203 has an inter-access point communication function and is capable of connecting to another wireless bridge 205 (or the other wireless bridge 205 operates as a terminal station connected to an access point). The wireless bridge 205 is capable of receiving data via the wireless transmission path 204 and transferring the received data to a communication terminal 207, such as a personal computer (PC), via a wired transmission path 206.

Power line communication (PLC) is another technology for building a network in a building. In the power line communication, a device having a communication function and which accepts supply of power via a power line superimposes a communication signal upon the power line, and communicates with another device having a similar function via the power line.

In the wireless LAN, transmission output is not high because of legal regulations related to radio waves and in order to avoid interference with another system, and thus communication between different rooms may be impossible because of presence of a wall. Meanwhile, in the power line communication, the existing power line is used to realize communication between different devices placed at different rooms provided with AC sockets, and locations of the devices do not pose a problem. The power line communication makes it possible to build the LAN without the need to provide Ethernet (registered trademark) throughout the building, and realize high-speed communication of 100 Mbps or more.

FIG. 10 illustrates an exemplary structure of a communications system in which a part of a wired transmission path between a sever 301 and a communication terminal 307, such as a PC, is replaced with a power-line transmission path 304 by means of a pair of PLC bridge devices 303 and 305. In FIG. 10, the PLC bridge device 303 has a network interface function of connecting to the server 301 via a wired transmission path 302, and a PLC interface function. The PLC bridge device 303 is connected to the other PLC bridge device 305 via the power-line transmission path (i.e., a power line) 304. The PLC bridge device 305 is connected to the communication terminal 307, such as the PC, via a wired transmission path 306.

In the system structure as shown in FIG. 10, communication apparatuses such as the PLC bridge devices need to be placed near the AC sockets. However, when the PLC bridge device is provided with a function of transmitting a signal received via the AC socket to another wireless communication apparatus using a radio signal, the other wireless communication apparatus may be placed at any place (see JP-A-2002-374189, for example).

Here, in general, in wireless communication technologies, systems that use the same frequency channel are easily affected by influence of interference therebetween, a transmission speed is not stable depending on radio wave conditions, and a problem may happen with a traffic that requires high-speed transmission. On the other hand, in the communications system that uses the power line communication, communication behavior varies depending on the structure of a building in which communication is carried out, and communication is easily affected by influence of noises that occur because of everyday actions (such as plugging in and out of a cord, use of a drier, etc.). Thus, in the communications system that uses the power line communication, an ideal transmission speed is not always achieved, and an actual transmission speed may undergo a great reduction depending on noise conditions.

Thus, while the wireless LAN and the power line communication are easy to implement, the), are communications systems that are incapable of stably achieving high-speed communication. Thus, when very high traffic is needed as in high definition transfer, it is very likely that a high enough transmission speed be not achieved thereby.

As such, as a means to allow communication to be performed continuously, methods have been proposed of switching between the wireless LAN and the power line communication to use one of the two transmission media which has the better communication condition (see JP-A-2002-319947 and JP-A-2005-354159). Such communication methods result in improved communication quality, but since only one of the two transmission media is used, the highest possible transmission speed is a maximum transmission speed of one of the two transmission media. Thus, those communication methods also have a problem with stable transmission in high definition transfer or the like.

Further, a method of using the wireless LAN and the power line communication at the same time has been proposed. In this method one packet is divided between a wireless LAN interface and a power line communication interface, and divided parts of the packet are simultaneously transmitted and received, so that an increase in transmission speed is achieved (see JP-A-2006-109022, for example). In this type of communication method, in order to increase the transmission speed, a transmitter divides one packet into parts and adds information about packet division and information about an order of packets to data before transmission, and accordingly, a receiver needs to receive the divided parts of the packet from the respective transmission paths and reconstruct the original data therefrom. That is, in this type of communication method, the transmitter and receiver need be devices having the same mechanism, and this type of communication method has a compatibility problem.

SUMMARY

An advantage of the present application is to provide an excellent communications system and communication apparatus that are capable of building a LAN easily using a plurality of transmission media.

Another advantage of the present application is to provide an excellent communications system and communication apparatus that are capable of building a LAN easily in a building using a wireless LAN and power line communication.

Yet another advantage of the present application is to provide an excellent communications system and communication apparatus that are capable of realizing high-speed communication by using the wireless LAN and the power line communication at the same time.

Yet another advantage of the present application is provide an excellent communications system and communication apparatus that are capable of realizing high-speed communication using the wireless LAN and the power line communication at the same time while ensuring compatibility with another device.

According to an embodiment, there is provided a communications system that uses a plurality of transmission media, the communications system including: two or more communications interface combining adapters connected to one another via a power-line transmission path connected to common sockets and a wireless transmission path between wireless LAN access points, each of the two or more communications interface combining adapters having a power line communication interface and a wireless LAN interface, the wireless LAN interface having an access point function and an inter-access point communication function; wireless LAN terminals connected to the access points included in the communications interface combining adapters; and a wired LAN terminal connected to a wired LAN interface included in at least some of the communications interface combining adapters, wherein data transfer between the wireless LAN terminals or between one of the wireless LAN terminals and the wired LAN terminal is performed via a high-speed combined interface logically formed by using the power-line transmission path and the wireless transmission path between the access points between the communications interface combining adapters to which the terminals participating in the data transfer are connected.

Note that the term "system" as used in the term "communications system" refers to a logical collection of a plurality of devices (or functional modules that achieve specific functions), regardless of whether the devices or functional modules are contained in a single housing. Hereinafter the same shall apply.

The communications system according to an embodiment uses two or more transmission media, such as the wireless transmission path and the power-line transmission path. In the communications system, a communication apparatus at the transmitting end and a communication apparatus at the receiving end are connected to each other via the communications interface combining adapters, which have a hybrid network bridge function.

Wireless communication achieved by a wireless LAN or the like provides an easy means for network connection without the need of cable connection. In the wireless communication, however, a transmission speed is not stable depending on radio wave conditions, and a problem may happen with a traffic that requires high-speed transmission. On the other hand, the power line communication makes it possible to build a LAN without the need to provide Ethernet (registered trademark) throughout a building. In the power line communication, however, communication is easily affected by influence of noises that occur because of everyday actions, and an actual transmission speed may undergo a great reduction depending on noise conditions. That is, although the wireless LAN and the power line communication are easy to implement, they cannot always achieve an ideal transmission speed and tend to fail to have a high enough transmission speed when very high traffic is needed as in high definition transfer.

Further, a communications system has been proposed that achieves an increase in transmission speed by using the wireless LAN and the power line communication at the same time, but in this communications system, a transmitter and a receiver need be devices having the same mechanism. That is, this communications system has a compatibility problem.

In contrast, in the communications system according to an embodiment, the communications interface combining adapters are connected to each other via the power-line transmission path, which is connected to the common sockets, and the wireless transmission path between the wireless LAN access points, and the communications interface combining adapters are capable of communicating with each other stably at a high speed. The terminals that participate in data transfer only need to be connected to one of the communications interface combining adapters via the wired LAN interface or the wireless LAN interface to communicate with each other, and those terminals may be traditional communication terminals. Thus, the communications system according to the an embodiment does not have the compatibility problem.

Moreover, by forming a logical high-speed combined interface using the power-line transmission path and the wireless transmission path between the access points, the communications interface combining adapters are capable of communicating with each other faster and more stably than when only the power-line transmission path or only a wireless LAN communication path is used.

According to another embodiment, there is provided a communication apparatus that operates as the communications interface combining adapter in the communications system according to the first embodiment. This communication apparatus includes: a wireless communication interface having an access point function and an inter-access point communication function; a power line communication interface connected to common sockets; an interface combining unit for logically combining the inter-access point communication function in the wireless communication interface and the power line communication interface; and a bridging unit for bridging the access point function in the wireless communication interface and the interface combining unit. The interface combining unit logically combines the inter-access point communication function in the wireless communication interface and the power line communication interface to form a logical high-speed interface.

According to yet another embodiment, there is provided a communication apparatus that operates as the communications interface combining adapter in the communications system according to an embodiment previously described. This communication apparatus includes: a wireless communication interface having an access point function and an inter-access point communication function; a power line communication interface connected to common sockets; a wired communication interface that performs data communication via a cable; an interface combining unit for logically combining the inter-access point communication function in the wireless communication interface and the power line communication interface, and a bridging unit for bridging the access point function in the wireless communication interface and the interface combining unit, or bridging the wired communication interface and the interface combining unit. The interface combining unit logically combines the inter-access point communication function in the wireless communication interface and the power line communication interface to form a logical high-speed interface.

The present application provides an excellent communications system and communication apparatus that are capable of building a LAN easily in a building by using the wireless LAN and the power line communication according to an embodiment.

Also, the present application provides an excellent communications system and communication apparatus that are capable of realizing high-speed communication by using the wireless LAN and the power line communication at the same time according to an embodiment.

Also, the present application provides an excellent communications system and communication apparatus that are capable of realizing high-speed communication using the wireless LAN and the power line communication at the same time while ensuring compatibility with another device according to an embodiment.

According to an embodiment two or more transmission media, such as wireless communication and power line communication, that do not have a stable transmission speed are logically combined to form a logical high-speed interface, and each of the physical transmission media, such as wireless communication and wired communication, and the logical high-speed interface are bridged to achieve a high transmission speed stably.

Additional features and advantages are described herein, and will be apparent from the following Detailed Description and the figures.

BRIEF DESCRIPTION OF THE FIGURES

FIG. 8 shows an exemplary structure of a communications system for using the Internet at home;

FIG. 9 is a schematic diagram illustrating an exemplary structure of a communications system using the wireless LAN; and FIG. 10 is a diagram illustrating an exemplary structure of a communications system in which a part of a wired transmission path between a server and a communication terminal, such as a PC, is replaced with a power-line transmission path by means of a pair of PLC bridge devices.

DETAILED DESCRIPTION

An embodiment of the present application will be described in detail with reference to the accompanying drawings.

The present application relates to a communications system that relays data transmission using a power-line transmission path between different bridge devices. In a communications system using power line communication, communication behavior varies depending on the structure of a building in which communication is carried out, and communication is easily affected by influence of noises that occur because of everyday actions. As such, in one embodiment, the bridge devices have a hybrid network bridge function of relaying data transmission using composite media composed of a wireless transmission path and a power-line transmission path, and perform inter-access point communication therebetween using this function.

In wireless communication, systems using the same frequency channel are easily affected by influence of interference therebetween. In a wireless LAN, transmission output is not high because of legal regulations related to radio waves and in order to avoid interference with another system. Thus, the wireless LAN has a problem of restricted communication distance and difficulty in communication between different rooms because of presence of a wall between the rooms. On the other hand in the power line communication, existing equipment can be used to perform communication between different rooms, but there are problems in that communication behavior varies depending on the structure of the building, and that communication is easily affected by influence of noises that occur because of everyday actions (such as plugging in and out of a cord, use of a drier, etc.).

In contrast, in a communications system that relays data transmission using bridge devices connected to each other via two or more transmission media, the hybrid network bridge devices combine use of the transmission media or select one of the transmission media to achieve efficient, high-speed, and high-quality transfer in accordance with a transfer mode and communication conditions. If the hybrid network bridge device divides data to be transferred into parts, and transmits the divided parts alternately over the wireless transmission path and the power-line transmission path, an improved transmission speed is achieved compared with the case where only one of the transmission media is used. Thus, such a communications system is suitable for downloading of large-size data from a server to an information terminal, for example, as in high definition transfer, and for applications that require isochronous transfer, such as video streaming.

Figure 1:
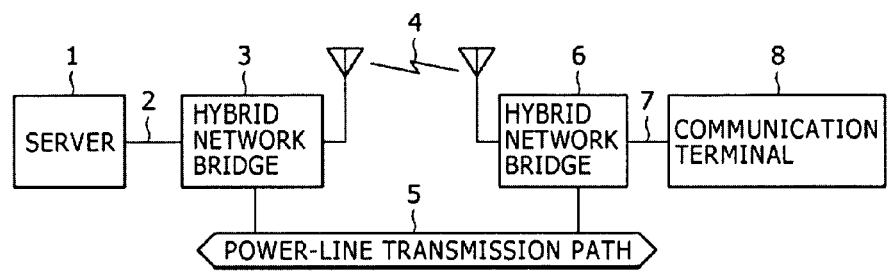
FIG. 1 a schematic diagram illustrating a structure of a communications system according to an embodiment.

FIG. 1 is a schematic diagram illustrating a structure of a communications system according to an embodiment. The system as shown in FIG. 1 is similar to the communications system as shown in FIG. 10 except that hybrid network bridge devices 3 and 6, which have a wireless LAN interface as well as a PLC interface, are used in place of the PLC bridge devices. Any frequency range may be used for a wireless transmission path. However, when the hybrid network bridge devices 3 and 6 conform to a standard wireless LAN standard such as IEEE 802.11a/g, the 2.4 GHz band or the 5 GHz band is commonly used. Meanwhile, in a power-line transmission medium, shortwave bands, i.e., the 3 MHz to 30 MHz frequency range, are commonly used.

The hybrid network bridge device 3 is connected to a server 1, which is a source for providing information, via a wired transmission path 2, such as Ethernet (registered trademark). The hybrid network bridge device 3 is also connected to the hybrid network bridge device 6 via hybrid transmission media composed of a combination or a wireless transmission path 4 and a power-line transmission path 5. The hybrid network bridge devices 3 and 6 perform inter-access point communication therebetween via the hybrid transmission media. The hybrid network bridge device 6 is connected to an communication terminal 8, such as a PC, via a wired transmission path 7. The communication terminal 8 requests the information.

The communications system as shown in FIG. 1 may be provided in a house, for example. In this case, the hybrid network bridge device 3, which has a connection to the Internet, and the hybrid network bridge device 6 may be placed on the first and second floors, respectively. Thus, the information terminal 8 placed on the second floor is able to access the Internet.

When data is transferred from the server 1 to the wireless communication terminal 8 in the communications system as shout in FIG. 1, the data is first transferred from the server 1 to the hybrid network bridge device 3 via the wired transmission path 2, such as Ethernet (registered trademark).

The hybrid network bridge device 3 receives the data (a packet) and transfers the received data to the hybrid network bridge device 6. At this time, the hybrid network bridge device 3 selects one of the wireless transmission path 4 and the power-line transmission path 5 to transfer the data to the hybrid network bridge device 6. Alternatively, the hybrid network bridge device 3 malt divide the data between the two transmission paths 4 and 5 for transfer. The hybrid network bridge device 6 receives the data and transmits the received data to the wireless communication terminal 8 via the wired transmission path 7.

Communication apparatuses that operate as the hybrid network bridge devices 3 and 6 are configured as a communications interface combining adapter that has three communication interfaces: a wired communication interface conforming to Ethernet (registered trademark) or the like; a power line communication interface; and a wireless communication interface usable for the wireless LAN or the like. Here, the wireless communication interface operates as an access point (a base station) in an infrastructure mode as defined in IEEE 802.11, for example, to allow a terminal station placed nearby to be included in its own network, and has an inter-access point communication (WDS: Wireless Distribution System) function of interconnecting to another adjacent access point.

The communication apparatuses that operate as the hybrid network bridge devices 3 and 6 form a logical high-speed interface by logically combining the inter-access point communication function in the wireless communication interface and the power line communication interface in order to achieve high-speed communication using the wireless LAN and the power line communication at the same time while ensuring compatibility with other devices. The communication apparatuses that operate as the hybrid network bridge devices 3 and 6 bridge an access point function in the wireless communication interface and the logical high-speed interface, and bridge the wired communication interface and the logical high-speed interface.

Figure 2:
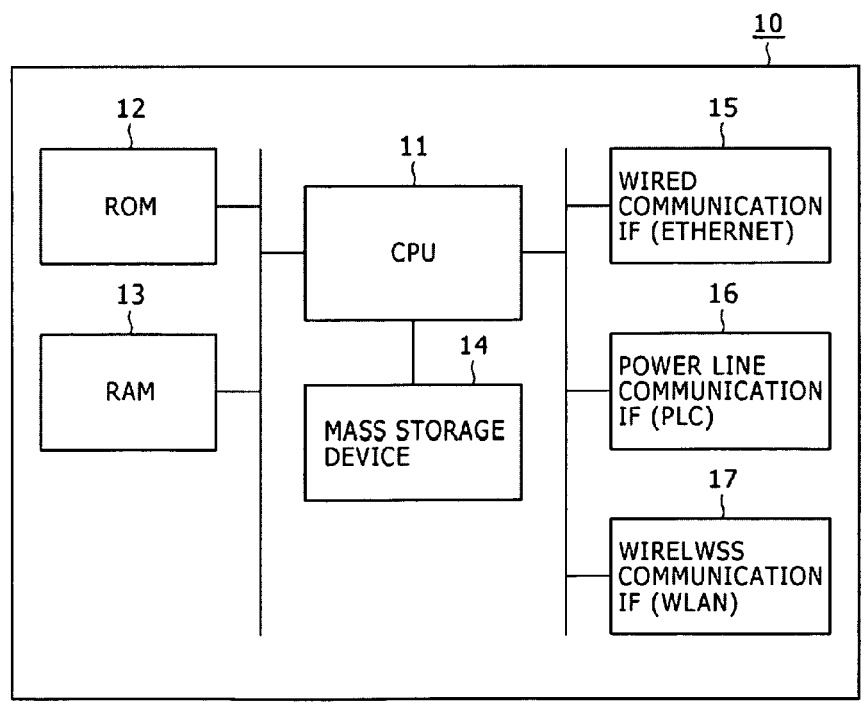
FIG. 2 is a schematic diagram illustrating an internal structure of a communications interface combining adapter that operates as a hybrid network bridge device.

FIG. 2 is a schematic diagram illustrating an internal structure of a communications interface combining adapter 10 that operates as the hybrid network bridge device 3 or 6 in the communications system as shout in FIG. 1.

The communications interface combining adapter 10 includes a central processing unit (CPU) 11, a read only memory (ROM) 12, a random access memory (RAM) 13, a mass storage device 14, an Ethernet (registered trademark) controller 15 as the wired LAN interface, a PLC controller 16 as the power line communication interface, a wireless controller 17 as the wireless LAN interface.

The CPU 11 executes a predetermined program code to control an overall operation of the communications interface combining adapter 10 by software processing in a centralized manner. The ROM 12 is a nonvolatile memory that stores an initial boot program, initial boot data, and so on. The RAM 13 is a main memory. The CPU 11 performs various processes in accordance with a program deployed in the RAM 13.

The mass storage device 14 is formed by a hard disk, a high-capacity flash memory, various types of memory cards, or the like, for example. The mass storage device 14 is used to store an additional software program, a data file, or the like.

The interfaces 15, 16, and 17 for the Ethernet (registered trademark), the power line communication (PLC), and the wireless LAN are connected to the CPU 11 via a peripheral component interface bus, such as peripheral component interconnect (PCI). Note that the functional blocks 11 to 14 are not limited to the units as shown in FIG. 2, as long as combining and bridging of the communication interfaces 15, 16, and 17 can be achieved.

As described above, the communications interface combining adapter according to the present embodiment is capable of logically combining the inter-access point communication function in the wireless LAN interface and the power line communication interface to form the logical high-speed interface, and bridging an access point function interface in the wireless LAN interface and the logical high-speed interface.

Figure 3:
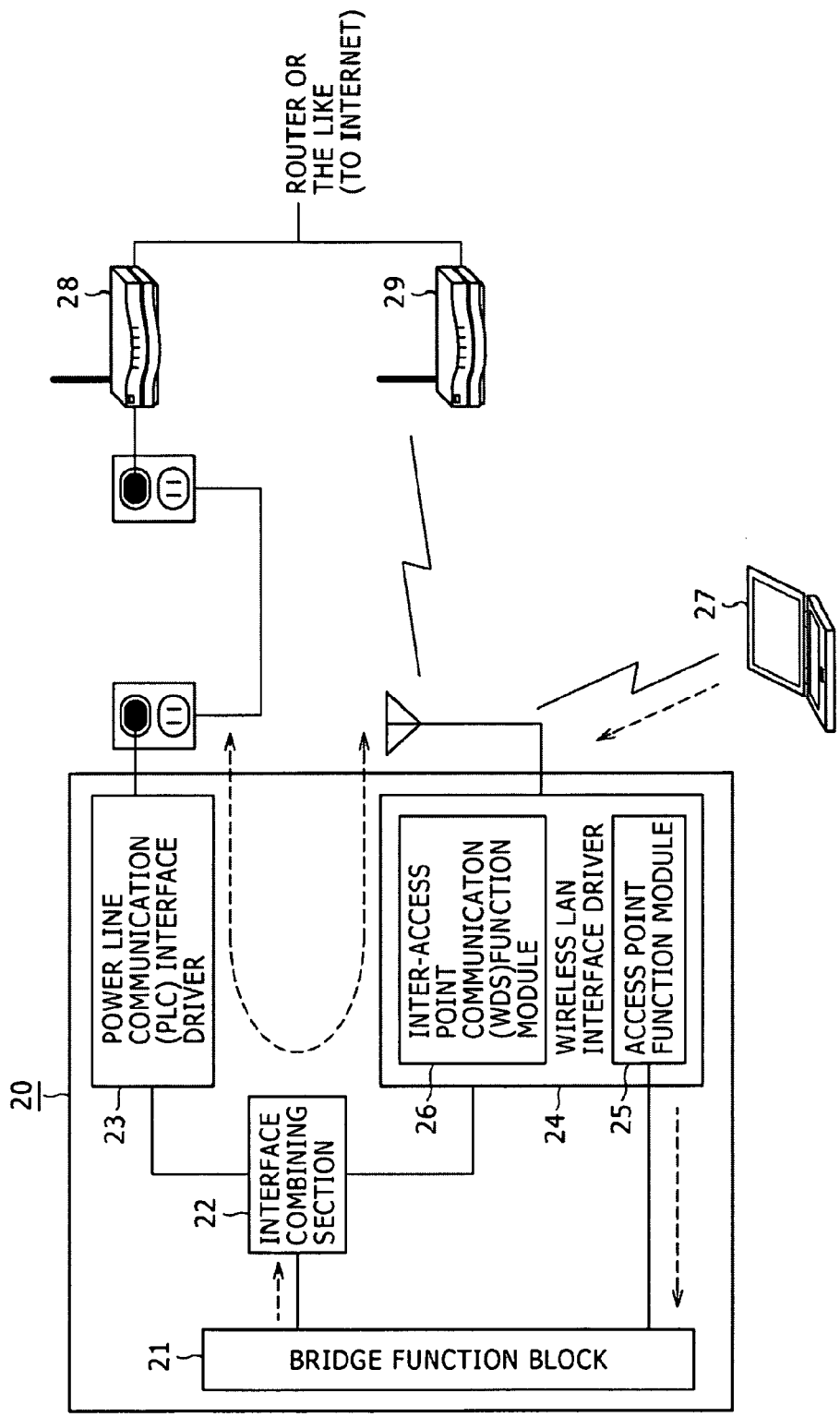
FIG. 3 is a conceptual diagram illustrating how bridging and interface combining are achieved when a peripheral terminal station of a wireless LAN accesses an external network via the communications interface combining adapter.

FIG. 3 is a conceptual diagram illustrating how bridging and interface combining are achieved when a peripheral terminal station of the wireless LAN accesses an external network via the communications interface combining adapter.

A communications interface combining adapter 20 as shows in FIG. 3 may be formed by a physical hardware device. In practice, however, the communications interface combining adapter 20 is formed logically as a result of the CPU 11 in the adapter as shown in FIG. 2 executing a predetermined software program for achieving the combining of the communication interfaces.

Reference numeral 21 denotes a bridge function block for bridging two or more communication interfaces. Reference numeral 22 denotes an interface combining section for combining two or more communication interfaces.

Reference numeral 23 denotes a device driver for the power line communication interface 16. The device driver 23 controls a communication operation in a power line, and performs a process of transmitting data over the power line or receiving data via the power line. Reference numeral 24 denotes a device driver for the wireless LAN interface 17. The device driver 24 controls a communication operation in the wireless LAN, and performs a process of transmitting data over the wireless LAN or receiving data via the wireless LAN.

The wireless LAN interface driver 24 includes an access point function module 25 and an inter-access point communication function module 26. The access point function module 25 allows the wireless LAN interface 17 to operate as an access point, and authorizes a wireless LAN terminal placed nearby to allow the wireless LAN terminal to be included in its own network, and transmits and receives data to or from the wireless LAN terminal within its own network. The inter-access point communication function module 26 uses the wireless LAN interface 17 to interconnect to another adjacent access point to achieve wireless bridging therebetween.

Reference numeral 27 denotes an external wireless LAN terminal. The wireless LAN terminal 27 is included in the network of the access point that is caused to operate by the access point function module 25. Reference numeral 28 denotes an external power line modem. The power line modem 28 is connected to an AC socket, and thus connected to the power line communication interface 16 via the power line within the building, for example. Reference numeral 29 denotes an external wireless LAN access point. The wireless LAN access point 29 performs inter-access point communication with the inter-access point communication function module 26 to achieve wireless bridging therebetween.

In the example of FIG. 3, the interface combining section 22 logically combines the inter-access point communication function module 26 in the wireless LAN interface driver 24 and the power line communication interface driver 23 to form a high-speed interface. The bridge function block 21 bridges the access point function module 25 in the wireless LAN interface driver 24 and the above high-speed interface.

The communications interface combining adapter 20 bridges the wireless LAN terminal connected thereto via the wireless LAN and a terminal connected thereto via the power line communication. In FIG. 3, dotted arrows indicate a flow of packet data that is transmitted from the wireless LAN terminal 27, which is included in the network provided b, the access point function module 25, to the external network.

First, the access point function module 25, which has authorized connection of the wireless LAN terminal 27 thereto, receives the data and sends the received data to the bridge function block 21. Since the bridge function block 21 bridges the access point function module 25 and the interface combining section 22, the bridge function block 21 receives the data and sends the received data as it is to the interface combining section 22.

Since the interface combining section 22 combines the power line communication interface driver 23 and the inter-access point communication function module 26, the interface combining section 22 receives the data and sends the received data to one of the power line communication interface driver 23 and the inter-access point communication function module 26 in accordance with a transmission scheduling rule. In such a manner, the data from the wireless LAN terminal 27 is transmitted to the external network through the adapter 20.

The above transmission scheduling rule may be of any kind, as long as the rule leads to an improvement in transmission speed. Round robin scheduling is one common example. Weight assignment may be carried out to divide the data between the two paths at some ratio.

In the example of FIG. 3, the power line modem 28 and the wireless LAN access point 29 are independent devices. It will be appreciated, however, that the power line modem 28 and the wireless LAN access point 29 may be replaced with a hybrid network bridge device that has functions of both the two devices. It should be noted here that a communication partner of the communications interface combining adapter 20 according to the present embodiment does not need to be a communications interface combining adapter that has a similar function, but may be an existing power line modem or wireless LAN access point. The communications interface combining adapter 20 is capable of forming a network with such an existing power line modem or wireless LAN access point without suffering from a compatibility problem. Also note that since the communications interface combining adapter 20 according to the present embodiment has the functions of both the power line modem and the wireless LAN access point, the communications interface combining adapter 20 can be used in place of the power line modem 28 and the wireless LAN access point 29.

Figure 4:
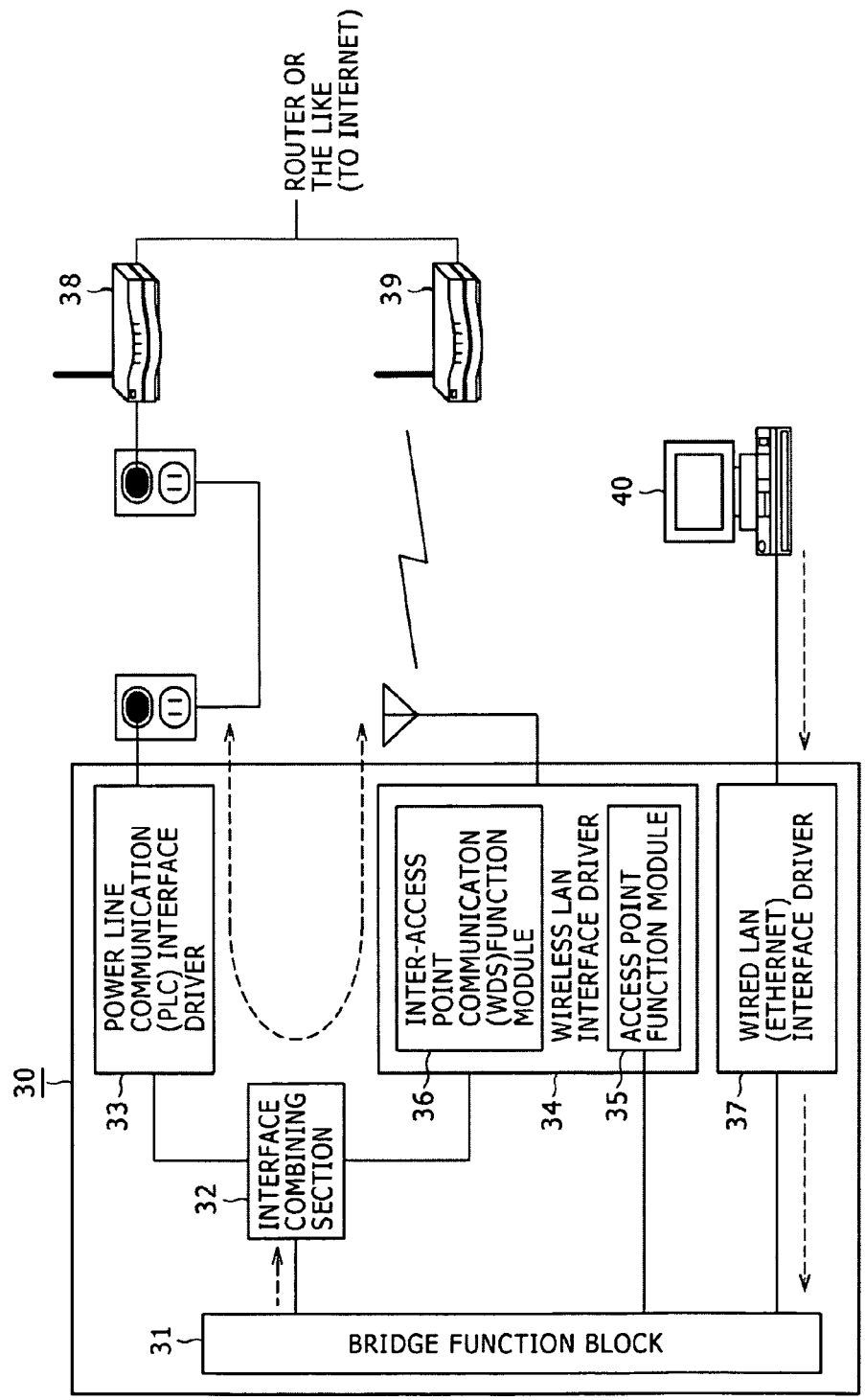
FIG. 4 is a conceptual diagram illustrating how bridging and interface combining are achieved when a wired LAN terminal accesses an external network through the communications interface combining adapter.

FIG. 4 is a conceptual diagram illustrating how bridging and interface combining are achieved when a wired LAN terminal accesses an external network via a communications interface combining adapter 30. The communications interface combining adapter 30 as shown in FIG. 4 logically combines the inter-access point communication function in the wireless LAN interface and the power line communication interface to form a logical high-speed interface, and bridges the wired LAN interface and the above logical high-speed interface.

In FIG. 4, the communications interface combining adapter 30 may be formed by a physical hardware device. In practice, however, the communications interface combining adapter 30 is formed logically as a result of the CPU 11 in the adapter as shown in FIG. 2 executing a predetermined software program for achieving the combining of the communication interfaces.

Reference numeral 31 denotes a bridge function block for bridging two or more interfaces. Reference numeral 32 denotes an interface combining section for combining two or more interfaces.

Reference numeral 33 denotes a device driver for the power line communication interface 16. The device driver 33 controls a communication operation in the power line, and performs a process of transmitting data over the power line or receiving data via the power line. Reference numeral 34 denotes a device driver for the wireless LAN interface 17. The device driver 34 controls a communication operation in the wireless LAN, and performs a process of transmitting data over the wireless LAN or receiving data via the wireless LAN.

The wireless LAN interface driver 34 includes an access point function module 35 and an inter-access point communication function module 36. The access point function module 35 allows the wireless LAN interface 17 to operate as an access point, and authorizes a wireless LAN terminal placed nearby to allow the wireless LAN terminal to be included in its own network and transmits and receives data to or from the wireless LAN terminal within its own network. The inter-access point communication function module 36 uses the wireless LAN interface 17 to interconnect to another adjacent access point to achieve wireless bridging therebetween.

Reference numeral 37 denotes a device driver for the wired LAN interface 15. The device driver 37 controls a communication operation in the wired LAN, and performs a process of transmitting data over the wired LAN or receiving data via the wired LAN.

Reference numeral 38 denotes an external power line modem. The power line modem 38 is connected to an AC socket, and thus connected to the power line communication interface 16 via the power line within the building, for example. Reference numeral 39 denotes an external wireless LAN access point. The wireless LAN access point 39 performs inter-access point communication with the inter-access point communication function module 36 to achieve wireless bridging therebetween. Reference numeral 40 denotes an external wired LAN terminal. The wired LAN terminal 40 is connected to the wired LAN interface 15 via a wired LAN cable, such as Ethernet (registered trademark).

In the example of FIG. 4, the interface combining section 32 logically combines the inter-access point communication function module 36 in the wireless LAN interface driver 34 and the power line communication interface driver 33 to form a high-speed interface. The bridge function block 31 bridges the access point function module 35 in the wireless LAN interface driver 34 and the above high-speed interface, and bridges the wired LAN interface driver 37 and the above high-speed interface.

The communications interface combining adapter 30 bridges the wired LAN terminal connected thereto via the wired LAN and a terminal connected thereto via at least one of the power line communication and the wireless LAN. In FIG. 4, dotted arrows indicate a flow of packet data that is transmitted from the wired LAN terminal 40, which is connected to the communications interface combining adapter 30 via the wired LAN, to the external network.

First, the wired LAN interface driver 37 receives the data from the wired LAN terminal 40, and sends the received data to the bridge function block 31. Since the bridge function block 31 bridges the wired LAN interface driver 37 and the interface combining section 32, the bridge function block 31 receives the data and sends the received data as it is to the interface combining section 32.

Since the interface combining section 32 combines the power line communication interface driver 33 and the inter-access point communication function module 36, the interface combining section 32 receives the data and sends the received data to one of the power line communication interface driver 33 and the inter-access point communication function module 36 in accordance with a transmission scheduling rule. In such a manner, the data from the wired LAN terminal 40 is transmitted to the external network through the adapter 30.

The above transmission scheduling rule may be of any kind, as long as the rule leads to an improvement in transmission speed. Round robin scheduling is one common example. Weight assignment may be carried out to divide the data between the two paths at some ratio.

In the example of FIG. 4, the power line modem 38 and the wireless LAN access point 39 are independent devices. It will be appreciated, however, that the power line modem 38 and the wireless LAN access point 39 mat, be replaced with a hybrid network bridge device that has functions of both the two devices. It should be noted here that a communication partner of the communications interface combining adapter 30 according to the present embodiment does not need to be a communications interface combining adapter that has a similar function, but may be an existing power line modem or wireless LAN access point. The communications interface combining adapter 30 is capable of forming a network with such an existing power line modem or wireless LAN access point without suffering from the compatibility problem. Also note that since the communications interface combining adapter 30 according to the present embodiment has the functions of both the power line modem and the wireless LAN access point, the communications interface combining adapter 30 can be used in place of the power line modem 38 and the wireless LAN access point 39.

Figure 5:
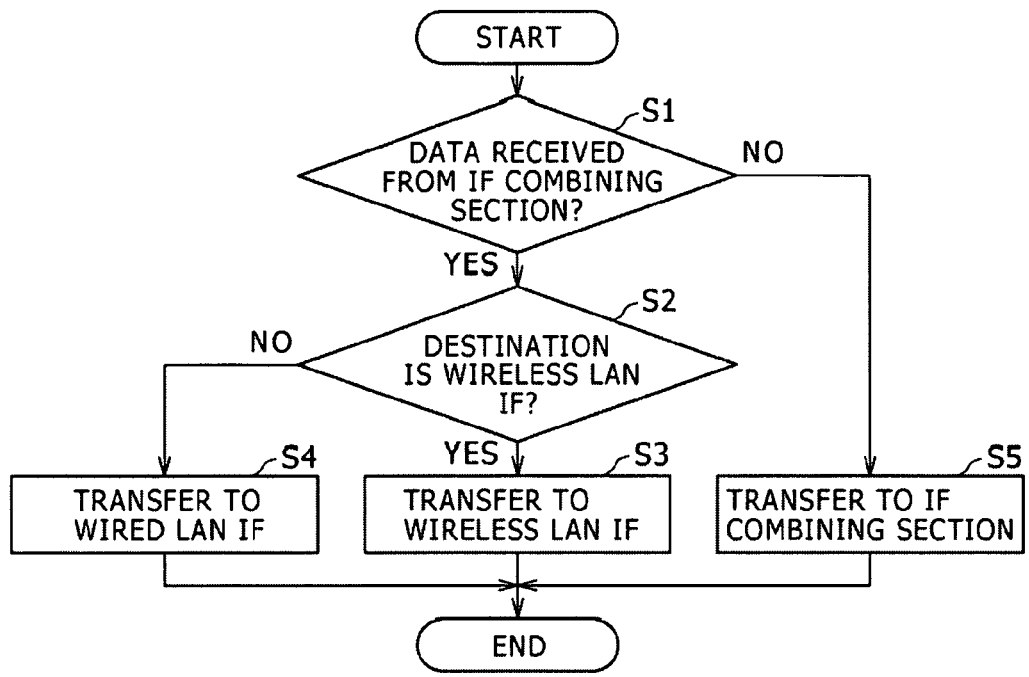
FIG. 5 is a flowchart illustrating a bridging procedure performed in a bridge function block within a communications interface combining adapter as shown in FIG. 4.

FIG. 5 is a flowchart illustrating a bridging procedure performed in the bridge function block 31 within the communications interface combining adapter 30 as shown in FIG. 4.

If the access point function module 35 in the wireless LAN interface driver 34 receives the data from the external wireless LAN terminal, the access point function module 35 transfers the received data as it is to the bridge function block 31 as described above. Similarly, if the wired LAN interface driver 37 receives the data from the external wired LAN terminal, the wired LAN interface driver 37 transfers the received data as it is to the bridge function block 31 as described above. If the bridge function block 31 receives the data from the access point function module 35 or the wired LAN interface driver 37 (No at step S1), the bridge function block 31 transfers the received data to the interface combining section 32 (step S5).

Meanwhile, if the bridge function block 31 receives the data from the interface combining section 32 (Yes at step S1), the bridge function block 31 checks a destination of that data (step S2), and transfers the received data to either the access point function module 35 in the wireless LAN interface driver 34 (step S3) or the wired LAN interface driver 37 (step S4).

Figure 6:
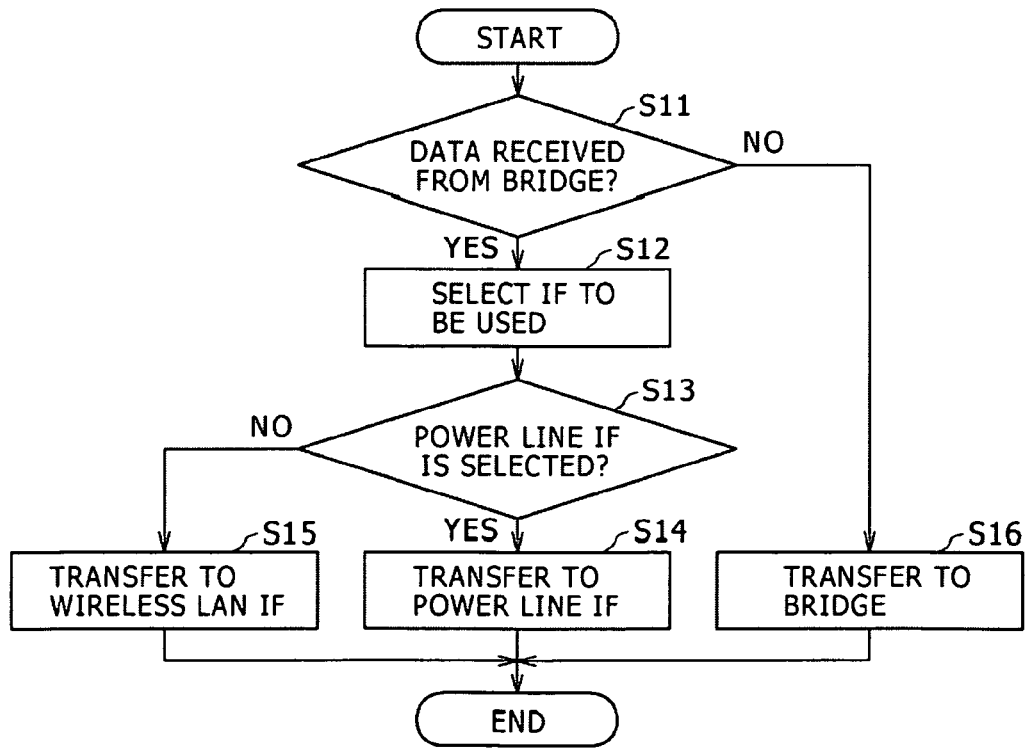
FIG. 6 is a flowchart illustrating an interface combining procedure performed in an interface combining section within the communications interface combining adapter 30 as shown in FIG. 4.

FIG. 6 is a flowchart illustrating an interface combining procedure performed in the interface combining section 32 within the communications interface combining adapter 30 as shown in FIG. 4.

First, the interface combining section 32 checks a source from which the interface combining section 32 has received the data (step S11).

If the interface combining section 32 has received the data from the bridge function block 31 (Yes at step S11), the interface combining section 32 selects one of the power line communication interface driver 33 and the inter-access point communication function module 36 within the wireless LAN interface driver 34, and transfers the received data to the selected one of the power line communication interface driver 33 and the inter-access point communication function module 36 (steps S12 to S15).

Meanwhile, if the interface combining section 32 has received the data from the power line communication interface driver 33 or the inter-access point communication function module 36 within the wireless LAN interface driver 34 (No at step S11), the interface combining section 32 sends the received data always to the bridge function block 31 (step S16).

Thus, the interface combining section 32 logically appears to the bridge function block 31 as a single high-speed interface composed of a combination of the power line communication interface driver 33 and the inter-access point communication function module 36 within the wireless LAN interface driver 34.

Figure 7:
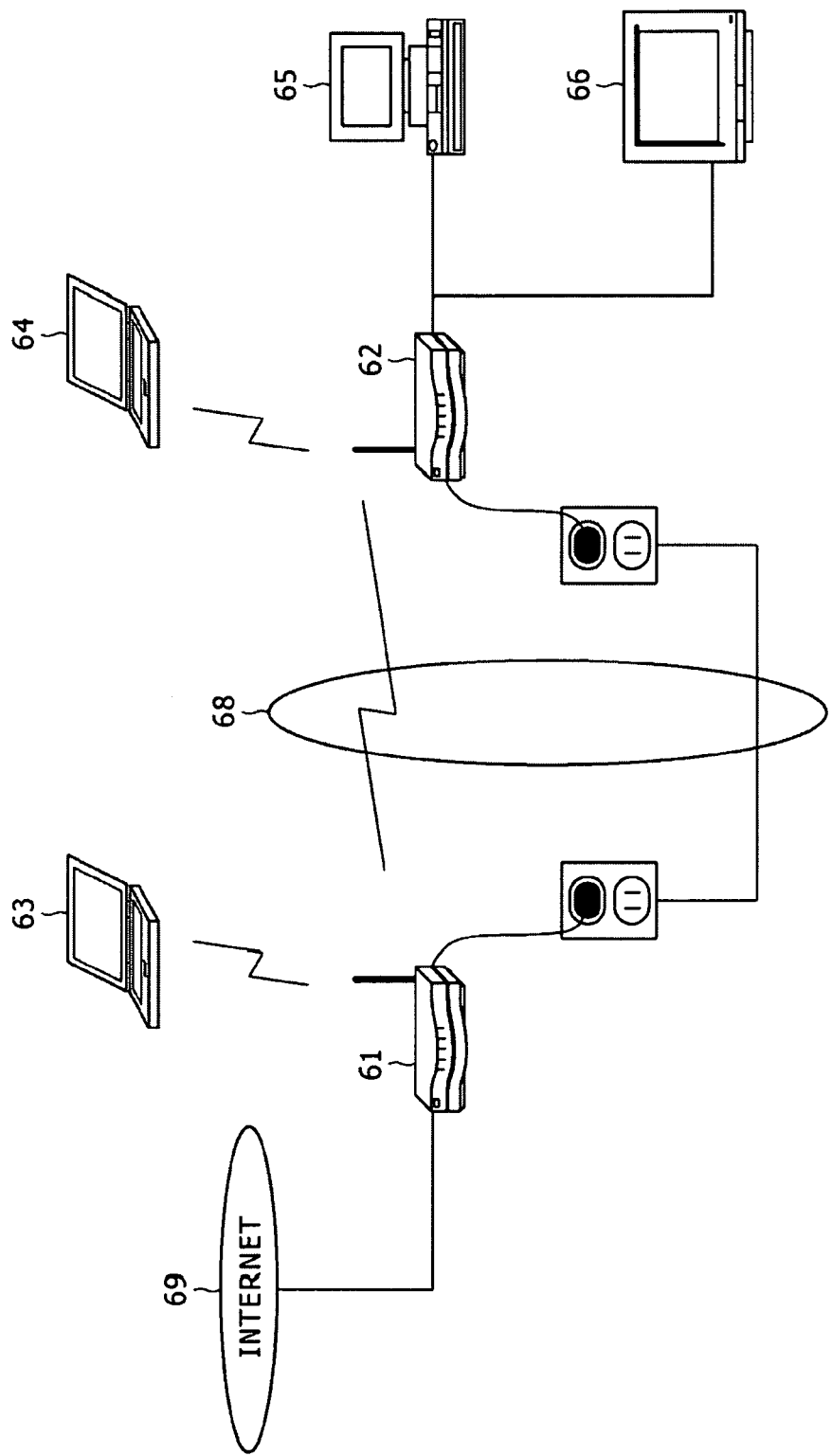
FIG. 7 shows an exemplary structure of a communications system that relays data transmission using communications interface combining adapters connected to each other via the wireless LAN and a power-line transmission path.

FIG. 7 shows an exemplary structure of a communications system that relays data transmission using communications interface combining adapters 61 and 62 connected to each other via the wireless LAN and the power-line transmission path.

The communications interface combining adapters 61 and 62 are equivalent to the communications interface combining adapter as shown in FIG. 4. The communications interface combining adapters 61 and 62 are connected to each other via the power-line transmission path, which is connected to common sockets, and a wireless transmission path between wireless LAN access points.

Reference numerals 63 and (A denote wireless LAN terminals. The wireless LAN terminals 63 and 64 are connected to the wireless LAN access points included in the communications interface combining adapters 61 and 62, respectively.

Reference numerals 65 and 66 denote common LAN terminal devices that use the wired LAN. The LAN terminal devices 65 and 66 are connected to the communications interface combining adapter 62. Examples of the LAN terminal devices include stationary information appliances such as personal computers or network home appliances.

Suppose that, in a network having the structure as shown in FIG. 7, the LAN terminal device 65 or 66 exchanges data with the Internet 69 or the wireless LAN terminal 63, for example. In this case, the data to be exchanged passes through a high-speed combined interface 68 logically formed by the communications interface combining adapters 61 and 62. Accordingly, faster and more stable communication is achieved than when the data passes through only the power-line transmission path or only a wireless LAN communication path.

In the communications systems according to the above-described embodiments, the data is transferred via the composite media composed of the wired transmission path, the wireless transmission path, and the power-line transmission path. However, this is not essential to the present application. The present application is also applicable to other types of communications systems in which data is transferred using multiple transmission media. In such cases also, two or more transmission media that do not have a stable transmission speed may be logically combined to form a logical high-speed interface, and each of the physical transmission media and the logical high-speed interface may be bridged to achieve a high transmission speed stably.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A communications system that uses a plurality of transmission media, the communications system comprising:
a first communications interface combining adapter having:
(a) a first power line communication interface;
(b) a wired local area network (LAN) interface; and
(c) a first wireless LAN interface having:
(i) a first access point function; and
(ii) a first inter-access point communication function;
(d) a first interface combining means for logically combining the first inter-access point communication function and the first power line communication interface;
a second communications interface combining adapter having:
(a) a second power line communication interface; and
(b) a second wireless LAN interface having:
(i) a second access point function; and
(ii) a second inter-access point communication function, the second communications interface combining adapter being connected to the first communications interface combining adapter via:
(A) a power-line transmission path connected to common sockets; and
(B) a wireless transmission path between wireless LAN access points;
(c) a second interface combining means for logically combining the first inter-access point communication function and the first power line communication interface;
a first wireless LAN terminal connected to a first access point corresponding to the first access point function;
a second wireless LAN terminal connected to a second access point corresponding to the first access point function;
a wired LAN terminal connected to the wired LAN interface;
wherein data is transmitted as a logically combined data flow between the first wireless LAN terminal and the second wireless LAN terminal or between the second wireless LAN terminal and the wired LAN terminal via a high-speed combined interface logically formed by simultaneously using both:
(a) the power-line transmission path corresponding to the first and second power line communication interfaces; and
(b) inter-access point communication between the first inter-access point communication function and the second inter-access point communication function.

2. A communication apparatus that combines a plurality of transmission media, the communication apparatus comprising:
a wireless communication interface having:
(a) an access point function; and
(b) an inter-access point communication function;
a power line communication interface;
an interface combining means for logically combining:
(a) the inter-access point communication function; and
(b) said power line communication interface, combining the inter-access point communication function and the power line communication interface such that data is transmitted from the communication apparatus as a logically combined data flow by simultaneously using both the inter-access point communication function and the power line communication interface; and a bridging means for bridging:
(a) the access point function; and
(b) said interface combining means.

3. The communication apparatus of claim 2, wherein:
(a) said bridging means passes data received from an external wireless communication terminal via the access point function to said interface combining means; and
(b) said interface combining means delivers the data to either said power line communication interface or the inter-access point communication function in accordance with a predetermined transmission scheduling rule.

4. A communication apparatus that combines a plurality of transmission media, the communication apparatus comprising:
a wireless communication interface having:
(a) an access point function; and
(b) an inter-access point communication function;
a power line communication interface;
a wired communication interface;
interface combining means for logically combining:
(a) the inter-access point communication function; and
(b) said power line communication interface, combining the inter-access point communication function and the power line communication interface such that data is transmitted from the communication apparatus as a logically combined data flow by simultaneously using both the inter-access point communication function and the power line communication interface; and
bridging means for bridging one of:
(a) the access point function and said interface combining means; and
(b) said wired communication interface and said interface combining means.

5. The communication apparatus of claim 4, wherein:
(a) said bridging means passes data received from an external wired communication terminal via said wired communication interface to said interface combining means; and
(b) said interface combining means delivers the data to either said power line communication interface or the inter-access point communication function in accordance with a predetermined transmission scheduling rule.

6. The communication apparatus of claim 4, wherein said bridging means:
(a) transfers data received from an external wireless communication terminal via the access point function and data received from an external wired communication terminal via said wired communication interface to said interface combining means; and
(b) transfers data received from said interface combining means to either the access point function or said wired communication interface in accordance with a destination of the data.

7. The communication apparatus of claim 4, wherein said interface combining means:
(a) selectively transfers data received from said bridging means to either said power line communication interface or the inter-access point communication function; and
(b) sends data received from said power line communication interface or the inter-access point communication function always to said bridging means.

* * * * *